United States Patent
Seago et al.

(10) Patent No.: US 10,684,897 B2
(45) Date of Patent: *Jun. 16, 2020

(54) EVENT NOTIFICATION

(71) Applicant: Red Hat, Inc., Raleigh, NC (US)

(72) Inventors: Scott Wayne Seago, Warwick, MA (US); Jason Guiditta, Oxford, CT (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,631

(22) Filed: Jun. 1, 2018

(65) Prior Publication Data

US 2018/0276056 A1    Sep. 27, 2018

Related U.S. Application Data

(63) Continuation of application No. 13/669,276, filed on Nov. 5, 2012, now Pat. No. 9,990,238.

(51) Int. Cl.
*G06F 9/54* (2006.01)
*G06F 9/50* (2006.01)

(52) U.S. Cl.
CPC ............ *G06F 9/542* (2013.01); *G06F 9/5077* (2013.01); *G06F 2209/544* (2013.01)

(58) Field of Classification Search
CPC ... G06F 9/542; G06F 9/5077; G06F 2209/544
See application file for complete search history.

(56) References Cited

U.S. PATENT DOCUMENTS

| | | | |
|---|---|---|---|
| 7,161,487 B1 | 1/2007 | Tracey et al. | |
| 7,496,486 B1 | 2/2009 | Tracey et al. | |
| 8,595,234 B2 * | 11/2013 | Siripurapu | G06F 16/951 707/737 |
| 8,856,319 B1 | 10/2014 | Huang et al. | |
| 9,462,056 B1 * | 10/2016 | Protopopov | H04L 67/2838 |
| 2002/0120484 A1 * | 8/2002 | Bantz | G06Q 10/06316 705/7.26 |
| 2002/0170035 A1 | 11/2002 | Casati et al. | |
| 2006/0111092 A1 | 5/2006 | Harris et al. | |
| 2007/0174844 A1 | 7/2007 | Adams et al. | |
| 2008/0077462 A1 * | 3/2008 | Patel | G06Q 20/108 705/7.33 |
| 2009/0288084 A1 * | 11/2009 | Astete | G06F 9/45533 718/1 |
| 2009/0300149 A1 | 12/2009 | Ferris et al. | |
| 2009/0327292 A1 | 12/2009 | Janssen et al. | |
| 2010/0333084 A1 | 12/2010 | Dehaan | |
| 2011/0053672 A1 | 3/2011 | Gagner et al. | |

(Continued)

FOREIGN PATENT DOCUMENTS

| | | | | |
|---|---|---|---|---|
| EP | 2290540 A1 * | 3/2011 | ............ | G06F 9/542 |
| KR | 2008-0052327 A | 6/2008 | | |
| WO | 2013/158139 A1 | 10/2013 | | |

*Primary Examiner* — Kostas J Katsikis
(74) *Attorney, Agent, or Firm* — Lowenstein Sandler LLP

(57) ABSTRACT

A server computer determines that an application of a plurality of applications in a cloud subscribes to an event with respect to a plurality of attributes of event data. The server computer, responsive to determining that at least one of the plurality of attributes has changed, executes the application workflow and sends a notification to the application, the notification indicating that at least one of the plurality of attributes has changed.

21 Claims, 5 Drawing Sheets

(56) References Cited

U.S. PATENT DOCUMENTS

| | | |
|---|---|---|
| 2011/0055034 A1 | 3/2011 | Ferris et al. |
| 2011/0055378 A1 | 3/2011 | Ferris et al. |
| 2011/0071971 A1 | 3/2011 | Parks et al. |
| 2011/0173239 A1 | 7/2011 | Sayed et al. |
| 2011/0238820 A1 | 9/2011 | Matsuoka |
| 2011/0252084 A1* | 10/2011 | Schuchardt ......... G06F 11/2041 709/203 |
| 2011/0295727 A1 | 12/2011 | Ferris et al. |
| 2012/0011126 A1 | 1/2012 | Park et al. |
| 2012/0047519 A1 | 2/2012 | Mebane, III |
| 2012/0131139 A1* | 5/2012 | Siripurapu ............ G06F 16/951 709/217 |
| 2012/0131172 A1 | 5/2012 | Falk et al. |
| 2012/0131194 A1 | 5/2012 | Morgan |
| 2012/0137002 A1 | 5/2012 | Ferris et al. |
| 2012/0201169 A1 | 8/2012 | Subramanian et al. |
| 2012/0246282 A1 | 9/2012 | Oguchi |
| 2012/0311153 A1 | 12/2012 | Morgan |
| 2013/0007265 A1 | 1/2013 | Benedetti et al. |
| 2013/0167157 A1 | 6/2013 | Daumling et al. |
| 2013/0198718 A1 | 8/2013 | Kunze et al. |
| 2013/0198719 A1 | 8/2013 | Raman |
| 2013/0198763 A1 | 8/2013 | Kunze et al. |
| 2013/0254424 A1 | 9/2013 | Guay et al. |
| 2013/0263209 A1 | 10/2013 | Panuganty |
| 2013/0325960 A1 | 12/2013 | Agarwal et al. |
| 2014/0019335 A1* | 1/2014 | MacDonald ........... G06Q 10/06 705/39 |
| 2014/0047096 A1 | 2/2014 | Kupershmidt et al. |
| 2014/0059185 A1* | 2/2014 | Siripurapu ............ G06F 16/951 709/219 |
| 2014/0068767 A1 | 3/2014 | Mao et al. |

\* cited by examiner

EVENT NOTIFICATION

CROSS-REFERENCE TO RELATED APPLICATION

This application is a continuation application of Ser. No. 13/669,276, filed Nov. 5, 2012, the entire contents are hereby incorporated by reference.

TECHNICAL FIELD

Embodiments of the present disclosure relate to configurations of virtual machines and, more particularly, to a technique of event notification regarding virtual machines in a cloud.

BACKGROUND

Cloud computing is generally becoming the platform of choice for businesses that want to reduce operating expenses and be able to scale resources rapidly. Eased automation, flexibility, mobility, resiliency, and redundancy are several other advantages of moving resources to the cloud. Many organizations are being introduced to cloud computing by building an on-premise Infrastructure-as-a-Service (IaaS) cloud, which delivers computing, storage, and networking resources to users. Virtual machines in cloud computing are, for the most part, ephemeral. The state of a virtual machine is not persistent and is lost at shut down. A set of virtual machines can be launched with a particular configuration in a cloud one day and can be launched in a different cloud provider environment the next day. However, an extensive amount of time and work may be dedicated to tracking, logging, and parsing events that occur during the creation and life-cycle of the virtual machines.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Embodiments of the invention are directed to a method and system for event notification for objects in a cloud. Objects may include virtual machines, collections of virtual machines (deployments), applications executing in the virtual machines, images of virtual machines, collections of images of virtual machines (deployables), virtual machine hosts or other physical machines, or combinations of physical and virtual machines. An event server is configured to communicate with objects in a cloud computing environment. The event server detects events relating to the objects and logs event data or metadata (e.g., event attributes, such as what time the event occurred, what caused the event, what process happened, changes in state, etc.). Applications either executing in the cloud or outside of it can subscribe to events of interest, and the event server examines subscription data to identify applications that subscribe to the detected event. The event server then provides the event data to the identified applications.

An application may have a workflow that defines what steps should be performed in response to certain events. An event may be related to objects, and the application may focus, for example, on auditing, billing, or user access, with respect to the objects. For example, the event server may detect events such as 'Instance Start' (e.g., when a virtual machine is launched), 'Role Assigned' (e.g., when a specific user is granted access to a resource such as a virtual machine with a defined privilege level), 'Image Build Started' (e.g., when an image is built for a new virtual machine), and 'System Message' (e.g., when a virtual machine goes down unexpectedly). Some events may request user intervention (e.g., "Instance Start Request (approval required)"), and cannot be reported to subscribers until a user provides requested feedback; others, however, do not require user feedback and can be reported automatically. In one example, the event server examines subscription data to identify which applications subscribe to 'Instance Start', and then provides data associated with (or attributes of) 'Instance Start' to the identified applications.

Embodiments provide for efficient tracking, logging, and parsing of events that occur in a cloud-related system and data associated with these events. Embodiments further provide flexibility by capturing a variety of events in a defined format so that other systems have a known structure with which to work.

Figure 1:
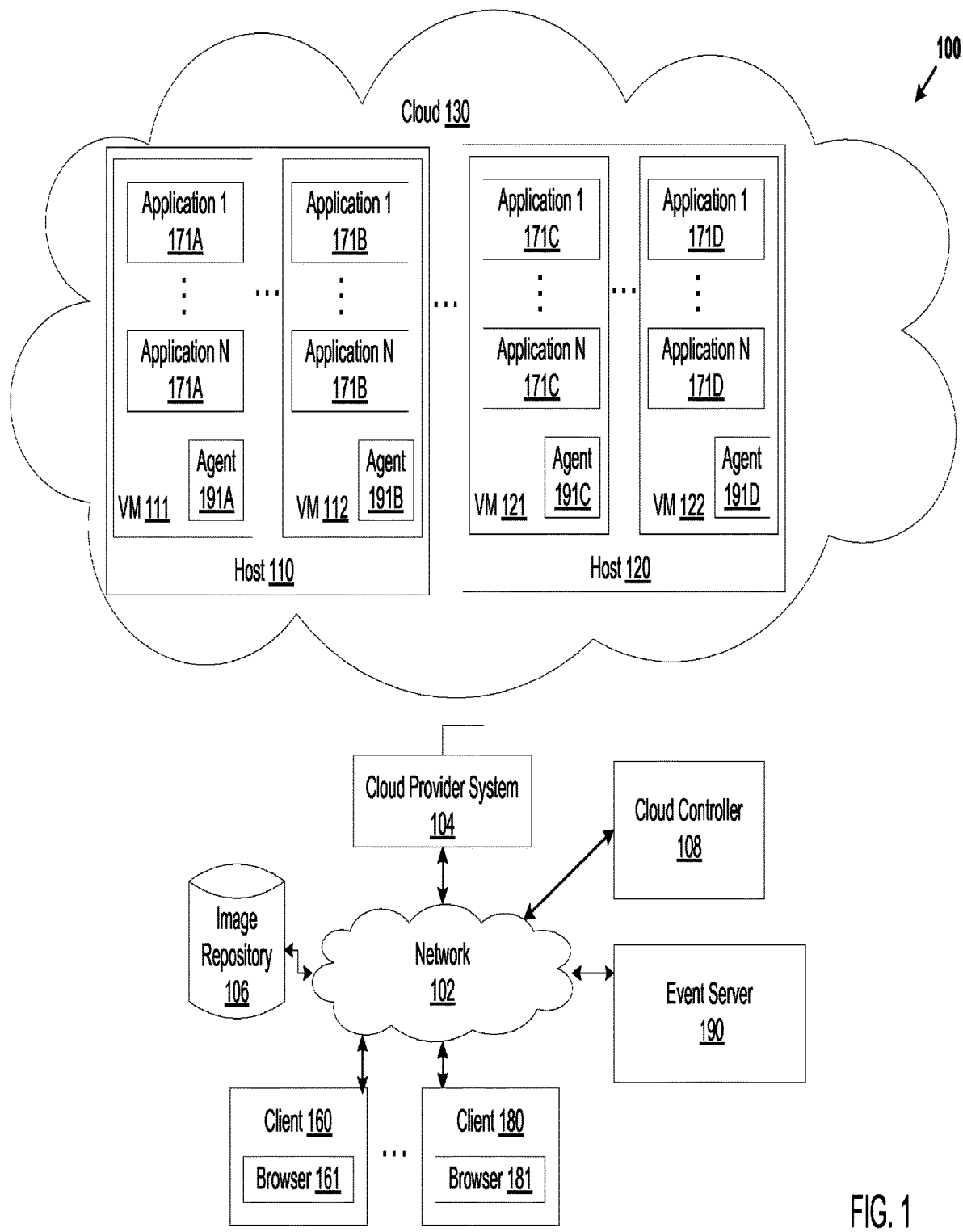
FIG. 1 is a block diagram of a network architecture for a distributed computing system, in which embodiments of the invention may operate.

FIG. 1 is a block diagram of a network architecture 100 for a distributed computing system, in which embodiments of the invention may operate. The network architecture 100 includes a cloud 130 managed by a cloud provider system 104. In an embodiment, the network architecture includes clouds from multiple cloud providers. The cloud 130 provides virtual machines, such as virtual machines 111, 112, 121, and 122. There can be any number of virtual machines in a cloud 130. Each virtual machine is hosted on a physical machine configured as part of the cloud 130. Such physical machines are often located in a data center. For example, virtual machines 111 and 112 are hosted on physical machine 110 in cloud 130 provided by cloud provider 104. The cloud provider system 104 and cloud 130 may be provided as an infrastructure as a service (IaaS) layer. The cloud provider system 104 and cloud 130 may be provided by, for example, a third party cloud provider. Users can interact with applications executing on cloud-based virtual machines using client computer systems, such as clients 160, 180, via corresponding web browser programs 161, 181. Users may have one or more accounts associated with a cloud provider system 104.

Clients 160, 180 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 and an event server 190 via the network 102. The cloud controller 108 and event server 190 may reside on the same machine or different machines (e.g., server computers, desktop computers, etc.). The cloud controller 108 and event server 190 may be maintained by a cloud consumer of cloud 130, such as an enterprise (e.g., business, company). In another embodiment, the cloud controller 108 and event server 190 may be maintained by a third party cloud provider. In yet another embodiment, the cloud controller 108 and/or event server 190 may be part of the cloud provider system 104.

The cloud controller 108 may manage the execution of applications in the cloud 130. The cloud controller 108 may receive input, for example, from a system administrator via a client 160, 180, describing VMs 111, 112, 121, 122 to be deployed in the cloud 130 for execution of the applications. A VM may execute one or more applications. Alternatively, several VMs may be used to execute a single application (a composite application), with each virtual machine executing one or more components of a composite application. An image repository 106 can be populated with application deployment data to be used to deploy the VMs 111, 112, 121, 122. In one embodiment, the cloud controller 108 generates the application deployment data based on the user input and stores the application deployment data in the image repository 106. The repository 106 may reside locally or remotely and may represent a single data structure or multiple data structures (databases, repositories, files, etc.) residing on one or more mass storage devices, such as magnetic or optical storage based disks, solid-state drives (SSDs) or hard drives.

The application deployment data can be described in a structured format that specifies the bootable operating system, any software requirements, configuration provided or required, and any specific targeting information to instantiate a virtual machine. The application deployment data can be a hierarchy of data that includes deployables, assemblies, and templates. Each deployable describes an overview of one or more virtual machines to be deployed as a group. A deployable can describe a deployment of any number of arbitrarily large and complex deployments of virtual machines or a small number of virtual machines. For brevity and simplicity, a deployment of four virtual machines is used as an example in architecture 100. A deployable is described by an XML file.

An assembly is a description of a virtual machine to be deployed. An assembly is described by an XML file. An assembly can include the description of a service to be provided by a virtual machine, the description of a service to be used by a virtual machine, and the description of one or more parameter values provided by or relied upon by a virtual machine.

A template is a description of a disk image and meta-data for creating a virtual machine image. A virtual machine image can be created based on a template. A virtual machine image can be launched to instantiate (create) a virtual machine in a cloud. A template is described by an XML file.

Returning to FIG. 1, upon receiving a command identifying a specific deployable to launch, the cloud provider system 104 retrieves a reference to the existing image for each virtual machine available to be run/cloned on top of a hypervisor (not shown). If the image is not in the image repository 106, other elements of the stack may be used to place the image in the repository 106. The command may be received from the cloud controller 108 or a user (e.g., a system administrator) via a console computer or a client machine. The images can be launched in the cloud 130 to instantiate the virtual machines 111, 112, 121, 122 for the deployable. Launch of a virtual machine can include powering on or booting a virtual machine.

The event server 190 can detect the VMs 111, 112, 121, 122 that have been started (e.g., powered on or booted) for a deployable. The event server 190 can communicate with agents 191A-D running in the virtual machines to detect other events relating to the VM 111, 112, 121, 122 where the respective agent 191A-D is located. When a virtual machine image is launched (e.g., powered-on, booted) on a host in the cloud 130, the agent 191A-D executes in a corresponding virtual machine 111,112,121,122 to communicate with the event server 190.

Each agent 191A-D can provide a unique identifier (UID) to the event server 190 to represent a corresponding virtual machine. A UID can include a situationally unique (or a contextually unique) identifier.

In one embodiment, the event server 190 maintains a list of events that may be of interest to some applications 171 executing in the cloud 130. The events may include, for example, an addition of a virtual machine (e.g., 'Instance Start'), an assignment of a role to a virtual machine (e.g., 'Role Assigned'), a creation of a virtual machine image (e.g., 'Image Build Started'), and an issuance of a message specifying an action pertaining to a virtual machine (e.g., 'System Message'). The events may be specified by users of the applications 171 executing in the cloud 130. Alternatively, agents 191 may analyze workflows of respective applications 171 and determine what events are applicable to these workflows (e.g., what event will trigger the execution of a specific set of steps in the application). A workflow may specify steps to be executed by an application and events that determine the order in which the steps should executed.

Agents 191 may provide the above events to the event server 190, which will add the events to the list. Agents 191 may also determine subscription data for respective applications 171 and provide the subscription data to the event server 190. The subscription data may identify applications running in the cloud that are interested in certain events and may be created based on user input or the analysis of application workflows. The event server 190 may detect an occurrence of the event based on information provided by the agents 191 or information provided by the cloud provider system 104. The information provided by the cloud provider system 104 may specify a new host added to the cloud 130, current resource utilization (e.g., CPU or memory utilization) of a host, etc. The event server 190 may then identify applications that subscribed to the event, and provide event data to the agents associated with the subscribed applications. Upon receiving the event data, the agents distribute the event data to the subscribed applications.

In one example, a company's human resource department might want to track when employees access the company's system through a virtual machine in the cloud. Here, the human resources department might particularly want to know whether a terminated employee accessed the company's system. Therefore, a relevant application would subscribe to an event regarding employee access, and the application would then be notified if a terminated employee attempted to access the company's system, so that an email can be generated and sent to a human resources manager.

In another example, a company's accounts payable department might want to track virtual machine usage in a cloud for billing purposes. Here, a relevant application would subscribe to events regarding the beginning of use of a virtual machine and the end of use of the virtual machine, and the application would then be notified of these events so that billing information can be calculated based on the amount of time that the virtual machine was used.

Figure 2:
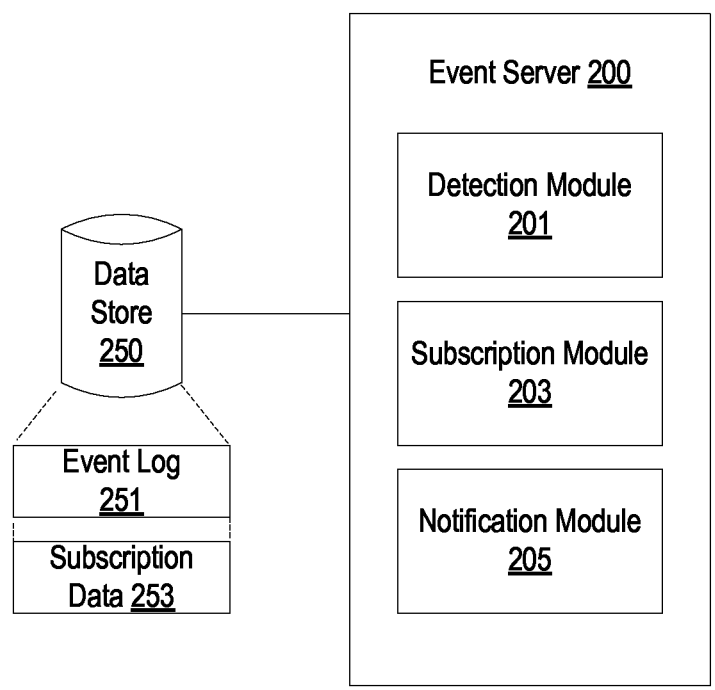
FIG. 2 is a block diagram of one embodiment of an event server, in accordance with an embodiment.

FIG. 2 illustrates a block diagram of one embodiment of an event server 200. In one embodiment, the event server 200 can be the same as the event server 190 of FIG. 1. Event server 200 includes a detection module 201, a subscription module 203, and a notification module 205. Note that in alternative embodiments, one or more of the detection module 201, subscription module 203, and/or notification module 205 may be combined into a single module. In other embodiments, the event server 200 does not include a subscription module. Additionally, the functionality of any of the detection module 201, subscription module 203, and notification module 205 may be divided between multiple modules.

The detection module 201 can detect an event relating to one or more virtual machine(s) that are configured in a cloud. The detection module 201 can retrieve event data, which includes event attributes or fields, for the virtual machines. The value of each event attribute of the event data can then be logged in event log 251.

The subscription module 203 can examine subscription data 253 to identify applications subscribing to the detected event. Applications 171A-D may subscribe to all event updates or only certain event updates.

The notification module 205 can then provide information, such as event data, about the detected event to the identified applications. Here, the notification module 405 provides only the information for which the identified application has subscribed, which may be all event data or only certain event data.

Figure 3:
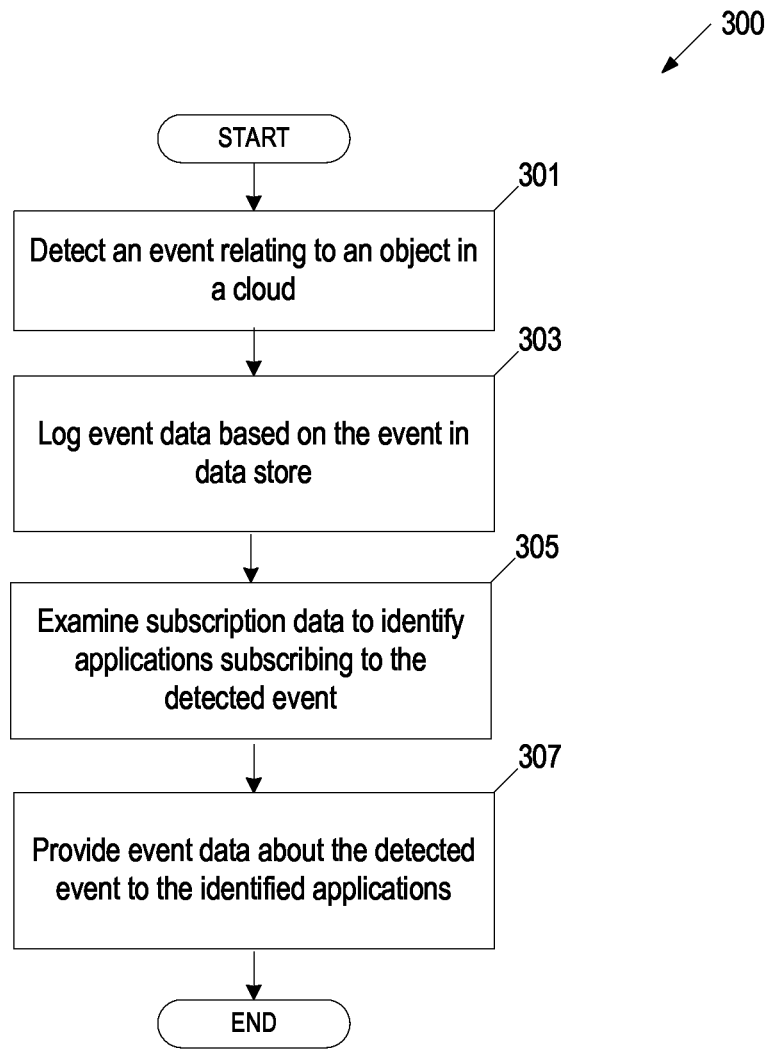
FIG. 3 is a flow diagram of an embodiment of a method for event notification for virtual machines in a cloud.

FIG. 3 is a flow diagram of an embodiment of a method 300 for event notification. The method 300 is performed by processing logic that may comprise hardware (circuitry, dedicated logic, etc.), software (such as is run on a general purpose computer system or a dedicated machine), or a combination of both. In one embodiment, the method 300 is performed by the event server 200 of FIG. 2.

At block 301, processing logic detects an event relating to one or more objects (e.g., virtual machines, collections of virtual machines, applications executing in virtual machines, virtual machine hosts, etc.) in a cloud. For example, the detection module 201 can detect an event (e.g., Cloud Instance Detail Record (CIDR) event, Cloud Deployment Detail Record (CDDR) event, Cloud Instance Action Record (CIAR) event) relating to objects in a cloud. The CIDR event corresponds to an occurrence of a virtual machine instance in the cloud. The CDDR event corresponds to an occurrence of an application deployment in the cloud. The CIAR event corresponds to the occurrence of an action performed on a virtual machine instance in the cloud. The action may be, for example, a migration of a virtual machine, a start of a virtual machine, a stop of a virtual machine, etc. The detection module 201 may detect an event based on event data received from agent 191 or cloud provider system 104.

At block 303, the detection module may record the event data using a predefined format. In an embodiment, event data includes event attributes. For example, event attributes for the CIDR event may include Event Id, Instance Id, Deployment Id, Image Id, Owner, Pool, Provider, Provider Type, Provider Account, Profile, Start Reason, Start Time, Terminate Reason, and Terminate Time for the virtual machine. Event attributes for the CDDR event may include, for example, Event Id, Deployment Id, Deployable Id, Owner, Pool, Provider, Provider Type, Provider Account, Start Time, Terminate Reason, and Terminate Time for the application deployment. Event attributes for the CIAR event may include, for example, Event Id, DateTime, Instance Id, Deployment Id, Operator, Action, and Result for an action performed on the virtual machine.

Descriptions of example event attributes are listed in Table 1.

TABLE 1

| | |
|---|---|
| Event ID | Unique id for the type of event |
| Instance Id | Unique instance identifier |
| Deployment Id | Unique application deployment identifier that is associated with the occurrence of the event |
| Image Id | Identifier that denotes the image that the particular instance was launched from |
| Owner | User name of the person who owns the instance or deployment |
| Pool | Name of the pool where the instance/deployment was launched |
| Provider | Provider where this deployment was launched |
| Provider Type | Type of cloud this provider is |
| Provider Account | Account used on the specified provider, denoted by username on provider |
| Hardware Profile | Name of hardware profile a particular instance is running on |
| Start Reason | Reason for starting (e.g., 'user initiate') or other values (e.g., 'scale') |
| Start Time | Time this instance began running |
| Terminate Reason | Reason for termination (e.g., 'user requested') or other values (e.g., 'system crash' or 'quota exceeded') |
| Terminate Time | Time this instance was terminated |
| Deployable | Unique id of the deployable (what a deployment is launched from) |
| Operator | User or system component performing an operation |
| Action | Indicates the action performed by an operator of the cloud provider system |
| Result | System response to the action |

The detection module 201 may add the event data in the event log 251 in the data store 250. In one embodiment, the event data is logged in the event log 251 via a computer data logging protocol, such as Syslog. In the Syslog example, there is a defined format for Syslog events, so the event data can be accessed by other systems designed to be compatible with Syslog. In another embodiment, an administrator can determine how event data is logged.

At block 305, processing logic examines subscription data to identify applications subscribing to the detected event. Applications may subscribe to all events or only certain events. In one embodiment, an application programming interface (API) is provided to allow applications 171A-D to subscribe to events or to trigger new events, such as a user response or action, based on a workflow of a subscribing component. For example, there may be a separate "approval workflow" component that subscribes to instance events which require user approval.

At block 307, processing logic provides event data about the detected event to the identified applications. For example, the notification module 405 may notify an application of a CIDR event or a CDDR event, and provide event data, such as event attributes (e.g., Event Id, Instance Id, Deployment Id, Image Id, Owner, Pool, Provider, Provider Type, Provider Account, Profile, Start Reason, Start Time, Terminate Reason, Terminate Time). In embodiments where a new event is triggered, the event server 200 notifies the appropriate user that intervention is required. In the example where there is an "approval workflow," the user may then use the workflow component to approve or deny the request.

In other embodiments, there may be a "high availability" component that subscribes to instance state change events. Here, when a notice that a particular instance has crashed is sent, a re-launch on another provider can be accomplished without requiring manual user intervention.

Figure 4:
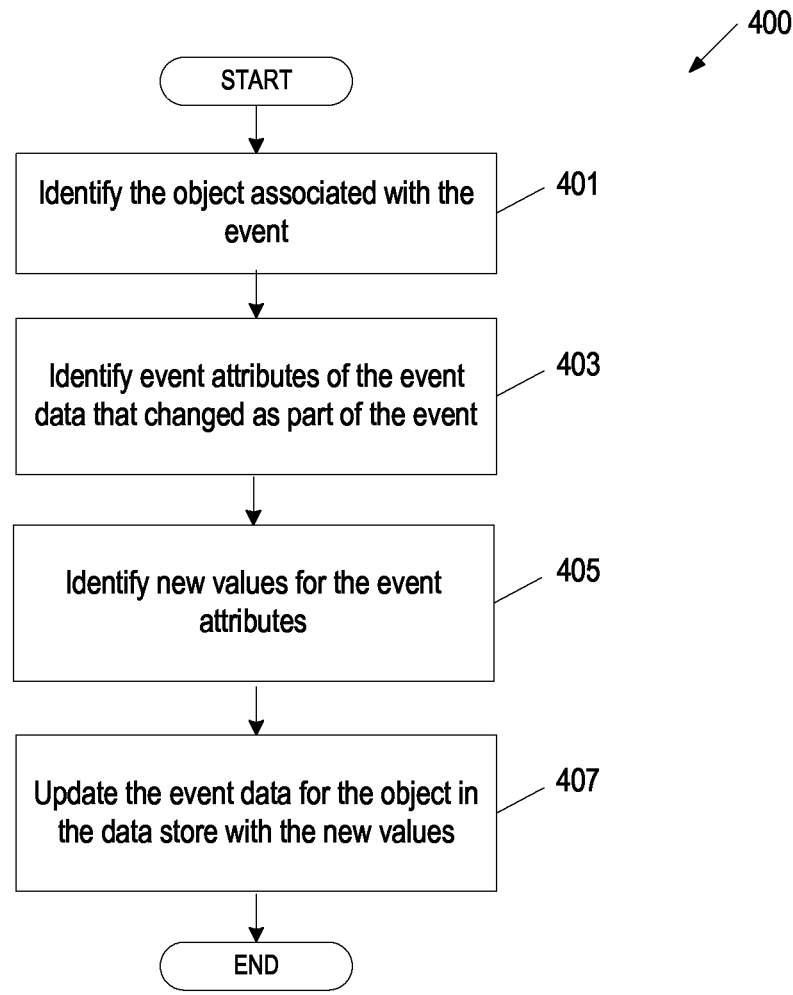
FIG. 4 is a flow diagram of an embodiment of a method for logging event data based on an event.

FIG. 4 is a flow diagram of an embodiment of a method 400 for logging event data based on an event (block 303 of FIG. 3). The method 400 is performed by processing logic that may comprise hardware (circuitry, dedicated logic, etc.), software (such as is run on a general purpose computer system or a dedicated machine), or a combination of both. In one embodiment, the method 400 is performed by the event server 200 of FIG. 2.

At block 401, processing logic identifies an object associated with an event. For example, in the case of a CIDR event, a virtual machine associated with the CIDR event may be identified.

At block 403, processing logic identifies event attributes of the event data that changed as part of the event. For the CIDR event example, the event server 200 would identify new or changed virtual machine instance attributes, for the CIDR event.

At block 405, processing logic identifies new values for the identified event attributes (e.g., virtual machine instance attributes associated with the CIDR event), and at block 407, processing logic updates the event data for the object in the data store with the new values.

For the CIDR example, the new values for the event attributes of the CIDR event are logged in the event log 251 of the data store 250. In one embodiment, the updated event data is distributed to applications that have subscribed to the event. Applications may subscribe to be notified when certain attributes change as part of the event and be notified if these attributes (but not any other attributes) change.

For example, if there is a CIDR event indicating that a virtual machine instance just stopped, the virtual machine instance associated with the event is identified. The event server can determine which virtual machine instance fields (or event attributes) were changed when this event was triggered (e.g., by performing changed_fields method with respect to the event data). In the above example of the virtual machine instance stop event, the virtual machine instance state is changed to "stopped." If there is an event consumer (or application) registered (or subscribed) that is concerned only with events that relate to virtual machine instance state (e.g., instance started or instance stopped), that consumer will be notified of this event.

In another example, there may be another CIDR event that indicates that an instance has changed ownership. In particular, there may be a different user indicated as a new owner of the virtual machine instance. The event server can determine the change of the owner field by performing the changed_fields method with respect to the event data. The consumer subscribed to ownership changes will then be notified of this event. Alternatively, the consumer subscribed to virtual machine instance state changes only will not be notified of this event.

Figure 5:
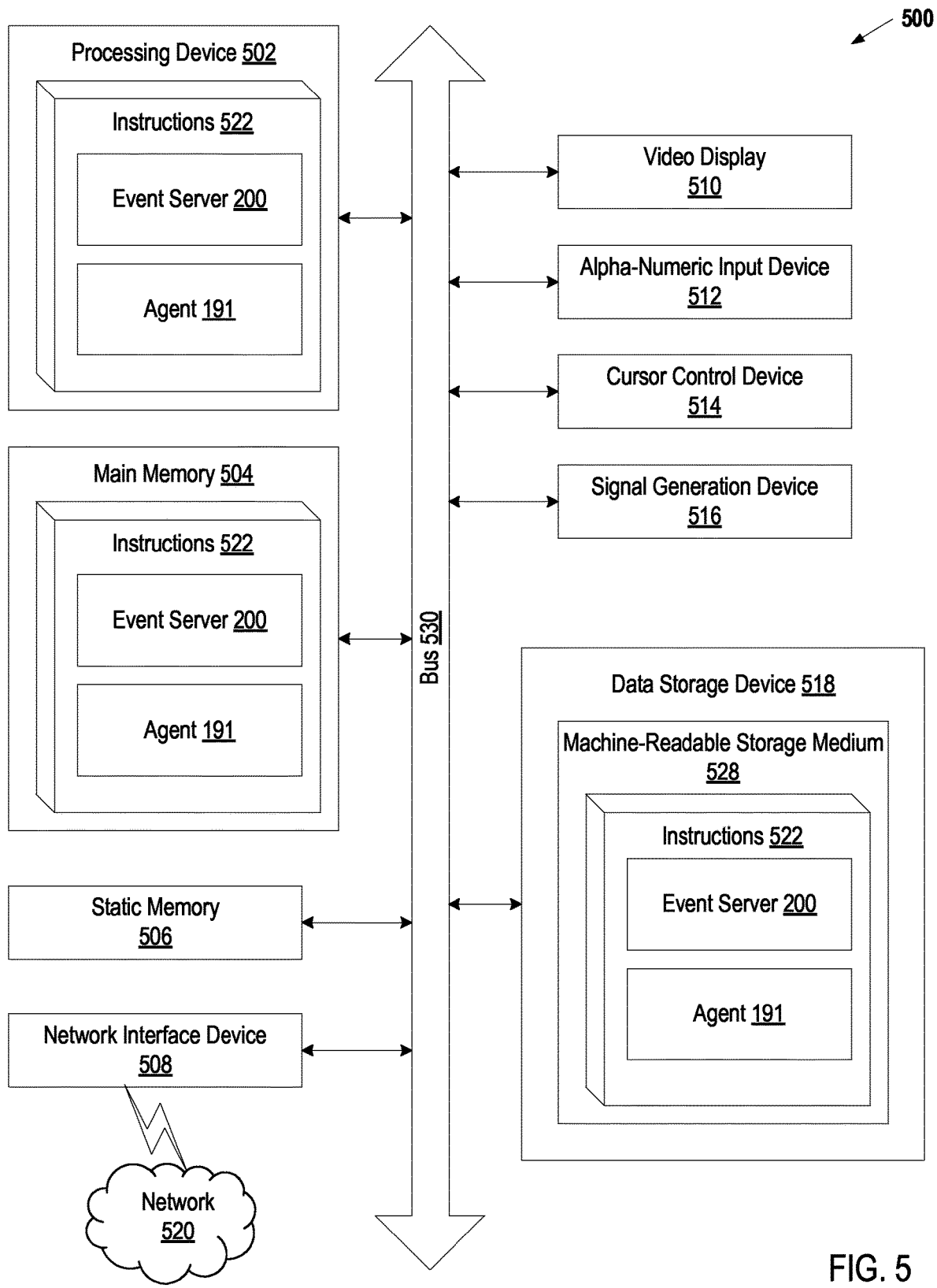
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for an event server (e.g., event server 200 of FIG. 2), an agent (e.g., agent 191A-D of FIG. 1), and/or a software library containing methods that call an event server and/or agent. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining, in view of a subscription data, that:
   a first application of a plurality of applications in a cloud subscribes to a first event with respect to a first plurality of attributes of first event data;
   a second application of the plurality of applications subscribes to a second event with respect to a second plurality of attributes of second event data; and
   a third application of the plurality of applications subscribes to a third event with respect to a third plurality of attributes of third event data, wherein the first event corresponds to an occurrence of a virtual machine instance in the cloud, the second event corresponds to an occurrence of an application executing in the virtual machine instance, and the third event corresponds to an occurrence of an action performed on the virtual machine instance, wherein the subscription data is generated in accordance with an analysis of a first application workflow, a second application workflow, and a third application workflow, and wherein the first plurality of attributes comprises at least a virtual machine state, the second plurality of attributes comprises at least an application deployment identifier (ID), and the third plurality of attributes comprises at least an action attribute; and
   responsive to determining that at least one of the first, second, or third plurality of attributes has changed:
   executing the corresponding first, second, or third application workflow;
   updating the corresponding first, second, or third event data associated with the corresponding first, second, or third event in a data store in view of the changed at least one attribute value; and
   providing the corresponding updated first second, or third event data to the corresponding first, second, or third application.

2. The method of claim 1, further comprising logging the first event data, the first event data comprising an identifier associated with the virtual machine instance, in the data store.

3. The method of claim 2, wherein the identifier is a unique identifier (UID) to represent the virtual machine instance.

4. The method of claim 2, wherein logging the first event data comprises:
   identifying the virtual machine instance associated with the first event;
   identifying virtual machine attributes that changed as part of the first event;
   identifying new values for the virtual machine attributes; and
   updating the first event data for the virtual machine instance in the data store with the new values.

5. The method of claim 1, wherein the first, second, and third plurality of attributes comprise event attributes.

6. The method of claim 1, further comprising logging metadata associated with the first, second, or third event.

7. The method of claim 1, wherein the first event data comprises virtual machine attributes.

8. The method of claim 1, further comprising:
   generating application deployment data based on user input; and
   storing the application deployment data in the data store.

9. The method of claim 1, further comprising providing an application programming interface to allow the first, second, or third application to subscribe to the corresponding first, second, or third event.

10. The method of claim 1, wherein the first, second, or third event data triggers a step in the corresponding first, second, or third application.

11. The method of claim 10, wherein the step is a required user action.

12. A method comprising:
determining, in view of a subscription data, that:
a first application of a plurality of applications in a cloud subscribes to a first event with respect to a first plurality of attributes of first event data;
a second application of the plurality of applications subscribes to a second event with respect to a second plurality of attributes of second event data; and
a third application of the plurality of applications subscribes to a third event with respect to a third plurality of attributes of third event data, wherein the first event corresponds to a virtual machine instance in the cloud, the second event corresponds to an occurrence of an application executing in the virtual machine instance, and the third event corresponds to an occurrence of an action performed on the virtual machine instance, wherein the subscription data is generated in accordance with an analysis of a first application workflow, a second application workflow, and a third application workflow, and wherein the first plurality of attributes comprises at least a virtual machine state, the second plurality of attributes comprises at least an application deployment identifier (ID), and the third plurality of attributes comprises at least an action attribute; and
responsive to determining that at least one of the first, second, or third plurality of attributes has changed:
executing the corresponding first, second, or third application workflow; and
sending a notification to the corresponding first, second, or third application, wherein the notification indicates that at least one of the corresponding first, second, or third plurality of attributes has changed.

13. The method of claim 12, further comprising logging the first event data, the first event data comprising an identifier associated with the virtual machine instance, in a data store.

14. The method of claim 12, wherein the first event data comprises a unique identifier (UID) to represent the virtual machine instance.

15. The method of claim 12, further comprising logging metadata associated with the first, second, or third event.

16. The method of claim 12, further comprising:
generating application deployment data based on user input; and
storing the application deployment data in a data store.

17. The method of claim 12, further comprising:
updating the first, second, or third event data associated with the corresponding first, second, or third event in a data store in view of the changed at least one attribute value; and
providing the corresponding first, second, or third event data to the corresponding first, second, or third application, wherein the corresponding first, second, or third event data triggers a step in the corresponding first, second, or third application.

18. A system comprising:
a memory; and
a processing device coupled to the memory to:
determine, in view of a subscription data, that:
a first application of a plurality of applications in a cloud subscribes to a first event with respect to a first plurality of attributes of first event data;
a second application of the plurality of applications subscribes to a second event with respect to a second plurality of attributes of second event data; and
a third application of the plurality of applications subscribes to a third event with respect to a third plurality of attributes of third event data, wherein the first event corresponds to a virtual machine instance in the cloud, the second event corresponds to an occurrence of an application executing in the virtual machine instance, and the third event corresponds to an occurrence of an action performed on the virtual machine instance, wherein the subscription data is generated in accordance with an analysis of a first application workflow, a second application workflow, and a third application workflow, and wherein the first plurality of attributes comprises at least a virtual machine state, the second plurality of attributes comprises at least an application deployment identifier (ID), and the third plurality of attributes comprises at least an action attribute; and
responsive to a determination that at least one of the first, second, or third plurality of attributes has changed:
execute the corresponding first, second, or third application workflow; and
send a notification to the corresponding first, second, or third application, wherein the notification indicates that at least one of the corresponding first, second, or third plurality of attributes has changed.

19. The system of claim 18, wherein the processing device is further to log the first, second, or third event data.

20. The system of claim 18, wherein the processing device is further to log metadata associated with the first, second, or third event.

21. The method of claim 1, wherein the executing, the updating, and the providing are further responsive to determining that the subscription data of the first, second, or third application includes the at least one of the corresponding first, second, or third plurality of attributes that has changed.

* * * * *